Figure 1:
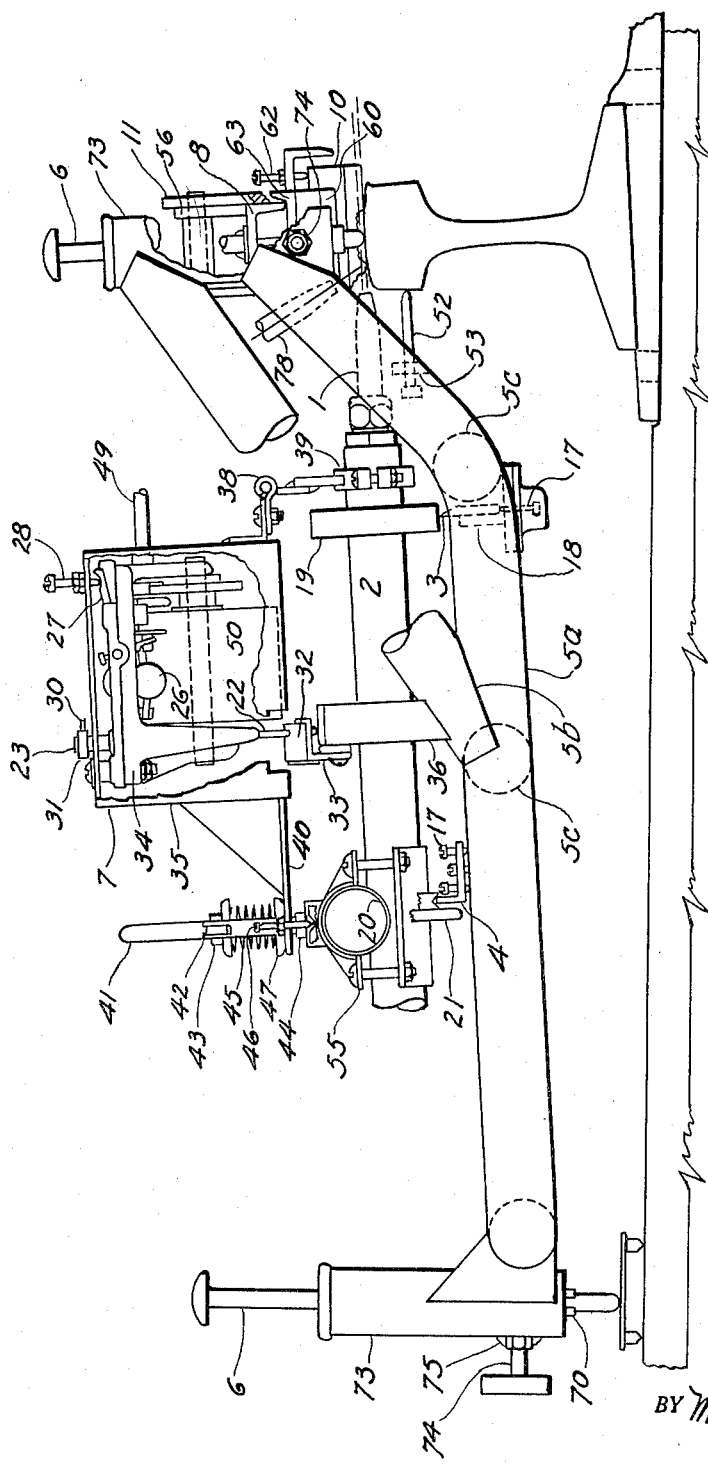

June 24, 1952   H. S. GEORGE   2,601,383
TORCH CUTTING APPARATUS FOR SURFACING WELD METAL
Filed Aug. 16, 1948   3 Sheets-Sheet 1

INVENTOR.
HARRY S. GEORGE.
BY *Moore, Nolte, Owens & Berry*
*His Attorneys*

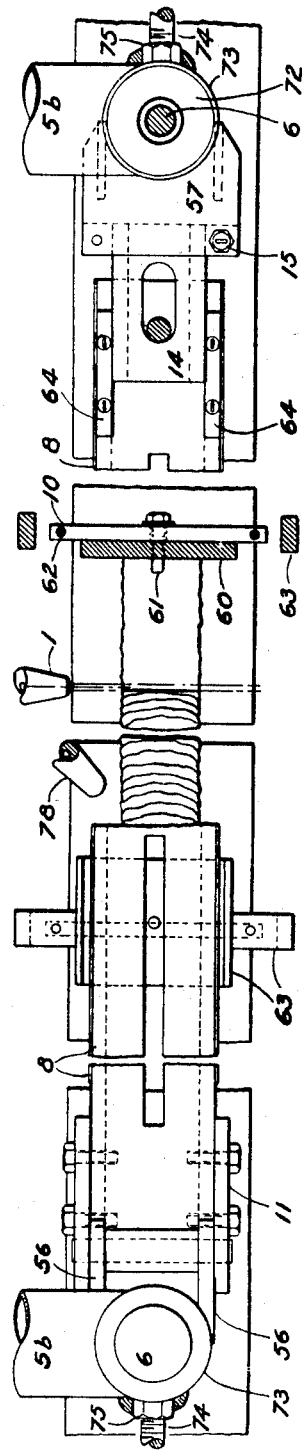

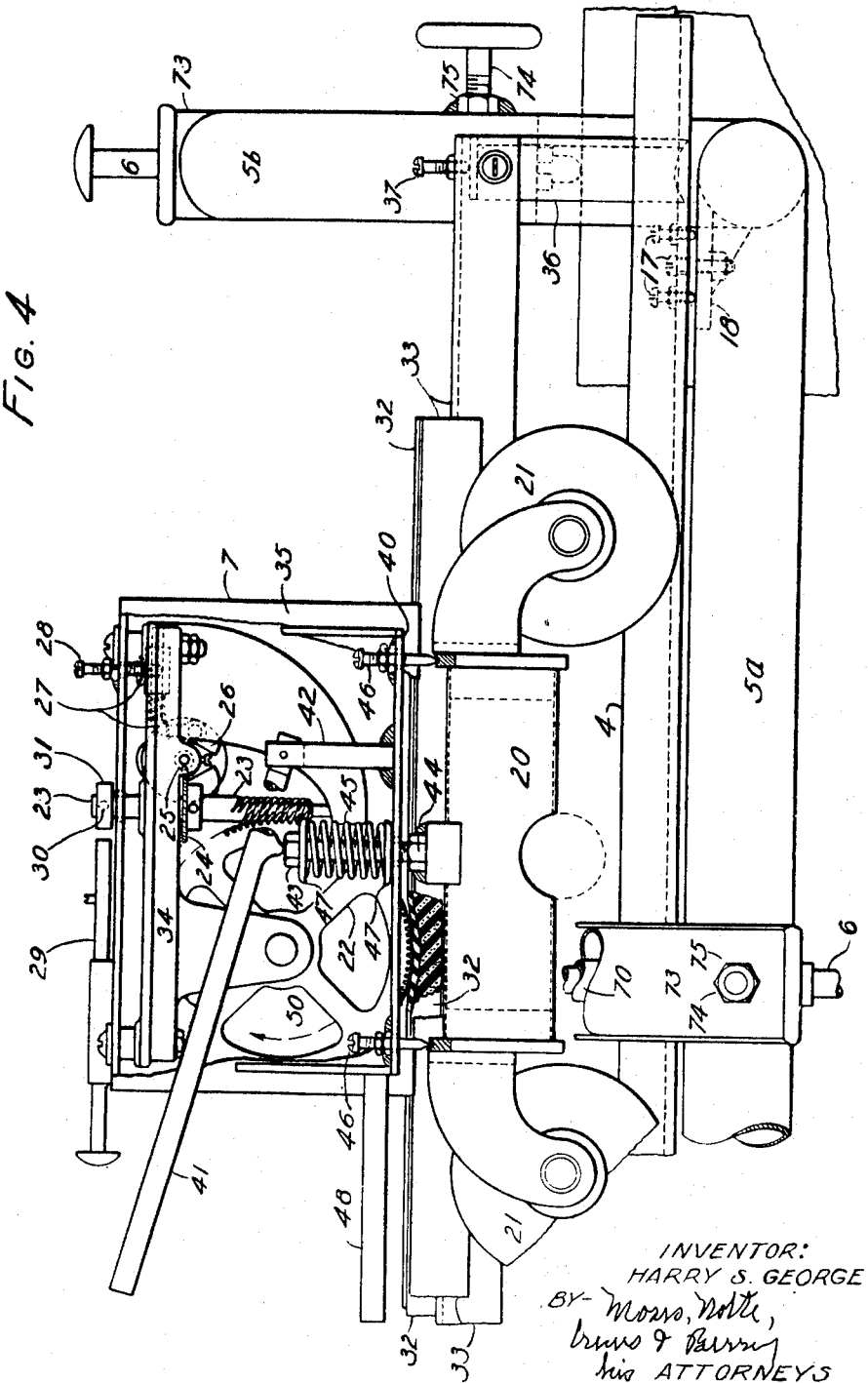

Patented June 24, 1952

2,601,383

UNITED STATES PATENT OFFICE 2,601,383

TORCH CUTTING APPARATUS FOR SURFACING WELD METAL

Harry S. George, Massapequa, N. Y.

Application August 16, 1948, Serial No. 44,568

7 Claims. (Cl. 266—23)

This invention relates to the repair of battered rail joints and similar operations and includes improvements in apparatus for finishing the surfaces of rails that have been repaired or built up by gas or electric welding. More particularly the invention has to do with surfacing by oxygen cutting.

The tread surface of a railroad rail usually wears down or batters more rapidly in the vicinity of the rail ends at the joints than elsewhere producing a depressed or battered zone which affects deleteriously not only the rolling stock but the joint fastenings and underlying ballast. Many railroads repair the battered surface at rail ends to an extent amounting to 3 to 10 per cent of all the joints annually, employing some form of oxyacetylene or electric welding to build up the worn surfaces, followed by surface finishing by means of hammering while hot and/or grinding after cooling.

The methods of finishing heretofore in use have been expensive and slow and have required laborious hand hammering or heavy, cumbersome, expensive grinding machines requiring a high degree of skill to produce a reasonably satisfactory finished surface. Former surfacing methods, moreover, have not included apparatus for predetermining and precisely indicating and controlling the plane of the finished surface but have relied on the judgment and skill of the operative.

The present invention eliminates hammering and surface grinding by the use of novel apparatus for oxygen cutting, makes feasible certain desirable modifications in the welding procedure, predetermines and controls the plane of the finished surface, and improves the physical characteristics of the finished product; all with a simplification of apparatus, lessened cost, faster production and greater durability of the product, as compared to former practice.

The invention is especially advantageous in connection with the "strip welding" process, as described in my United States Patents Numbered 2,186,966 and 2,186,967. Strip welding consists in depositing weld metal as a single longitudinal strip, preferably located to coincide with the "riding strip" of the adjacent rail surfaces, the width of the welded strip being substantially narrower than the head of the rail, usually about one inch wide, the rail head usually being 2½ to 3 inches wide. A discussion of the "riding strip" is included hereinafter. The principal advantages of strip welding, as compared with the former practice of "full ball welding," are increased durability of the product resulting from the control and increase of the hardness—inherent in the process-economy of welding materials, and increased production. Prior to the invention of strip welding it was the universal practice to deposit weld metal throughout the full width of the ball, or head, of the rail, or to otherwise build up the full width of the head, as by hammering or pressing in the sides of the rail ball to raise the level of the surface. These practices employed excessively large amounts of heat, were relatively slow, and resulted in inadequate hardness of the product.

While the present specification is directed illustratively to the strip welding and finishing of battered rail joints, the invention is not limited thereto, but has broad utility for other processes and purposes.

The following general discussion will tend to clarify the problem of repairing battered rail joints and to define terms used herein.

The nouns "surface," "rail surface," and "rail tread" designate the load carrying surface of the head of the rail upon which the tread of the wheel bears. When new, the conventional rail tread is convex, has a large radius of curvature—about 12 to 14 inches—and merges with the sides of the rail head through rounded corners having small radii of curvature (about ½").

The verb "surface" means to produce a load carrying surface on the rail head by welding, grinding, hammering, or other means, or combinations thereof.

"Real batter," as distinguished from "apparent batter," is the depth of the depressed area or zone on a rail tread surface caused by accelerated wear, such as occurs at a rail end at a joint. Real batter is usually measured from the bottom edge of a straight edge placed on the tread surface of the rail in a longitudinal position, parallel to the length of the rail, and extending over the depressed zone, by means of a taper or leaf gage and is expressed in thousandths of an inch.

The depth of wear or batter is the radial distance between the bottom of the straight edge and the surface at a given point and is measured along the radius of curvature at that point. The depth of batter is usually constant throughout the central portion of the tread surface on transverse contours at given distances from the rail end.

"Apparent batter" is measured from and by means of a straight edge spanning a joint and resting on both rails while "real batter" is measured by resting the straight edge on only one of the rails.

Apparent batter may be equal to, less than, or greater than, real batter, depending as it does on the relative heights and longitudinal slopes of the adjacent rail surfaces at a joint, in addition to the aforesaid accelerated wear.

Assuming ideal conditions with respect to the tread surface of a railroad rail and the tread surface of a wheel rolling thereon, the path of the axis of the wheel lies in a plane. Under such conditions the motion of rolling loads is smooth, resulting in minimum wear and tear on the carriage and its contents and on the rail, rail connections, and supports such as ties and ballast. It is an important object in track maintenance to approach as closely to this ideal as practicable.

New rail, laid end to end and joined by angle bars, well supported by ties and ballast, approaches the ideal condition as to surface but, owing to mill tolerances in the height of the rail, adjacent rails frequently vary as much as twenty thousandths of an inch in the height of the adjacent surfaces at the joints, and sometimes more.

In the course of time, owing to the greater wear of the rail surface in the immediate vicinity of rail ends, at joints, as compared to the more uniform wear throughout the intermediate surface, a so-called battered or depressed zone is produced on the surface at the joints. It is considered good practice to repair battered joints by welding and surface finishing to produce a smooth riding condition when the depression or batter—real or apparent—amounts to 30 to 40 thousandths of an inch below the general surface when measured at the rail ends, but in many cases batter is permitted to progress to 75 to 80 thousandths of an inch or more before being repaired. Usually the length of the battered zone is substantially proportionate to the depth of batter. The over-all length of the repaired zone usually ranges from 5 to 10 inches but may be much longer.

At the time of repair the unbattered surfaces of adjacent rails may or may not coincide with each other in height and longitudinal slope depending on several factors such as the maintenance of the angle bars, ties and ballast. Usually, although the adjacent surfaces are substantially coextensive, a straightedge set longitudinally in contact with the unbattered surface of one rail will not contact the corresponding surface of the abutting rail if extended over it.

Discrepancies in surface height at the ends of adjacent rails are often caused by the practice of re-laying used rail in new locations without matching rails in accordance with their previous relationship. In such cases the height and longitudinal inclination of the general tread surfaces of the adjacent rails seldom coincide, and this condition obviously increases the difficulty of producing a merging transition surface by surface grinding, as explained hereinafter.

An object of repairing battered rail joints by the present invention is to build up and finish the surface of the depressed zone on each of the adjacent rail ends, not necessarily to conform in longitudinal slope to the slope of the surface of its own rail, but to cause the finished surface to merge with the adjacent surfaces with a minimum change in slope throughout the joint, to produce a desirable transition surface.

An important feature of the present invention, which distinguishes it not only from all former apparatus for finishing the surface of built up rail joints but also from all prior oxygen cutting apparatus, has the function and utility of rapidly and precisely adapting the surfacing apparatus to the different conditions of consecutive rail joints outlined above.

The problem of repairing the surface at rail joints is further complicated and made more difficult by the fact that rail end wear occurs not only on the riding surface of the rail but also under the head, on the shoulder surfaces, where they bear on the angle bars, and by corresponding wear on the angle bars. The customary practices of reconditioning the joints to take up the aforesaid underhead wear by the use of shims, or by building up the worn bars, or by reforming the bars, often have the effect of stretching the web of the rail in the vicinity of the joint, thus increasing the height of the rail and reducing the apparent tread surface batter. In fact, batter is often not only eliminated by such measures but the longitudinal inclination of the plane of the rail surface at the end is caused to form an upward slope at an angle to the slope of the adjacent surface of the same rail. This upward tilt is often so sharp and short that, while there may be no depression at the extreme end of the rail, nevertheless a depression remains in a zone beginning about 3 to 5 inches from the rail end.

The aforesaid upward tilt of the rail end often extends above the plane of the rail tread surfaces in which case it is obvious that the extent of any intermediate depressed zones cannot be determined by the usual means, using a straightedge, as described above. Heretofore it has been the practice in such cases to make a rough estimate of the proposed over-all length of the weld, mark the extremities thereof, apply weld metal throughout the over-all length, and, subsequently, to surface grind the welded zone in the usual manner to a level approximately coextensive with the contiguous unwelded rail surfaces. This practice has resulted in removing all weld metal throughout the portion of the uptilted zone which may have been raised, prior to welding, to or above the said general level. Such exposed uncoated surface is obviously not as durable as rail coated by a strip weld and has therefore been subjected to premature batter in service. To overcome this objection I prefer to pre-grind a longitudinal depression in such uptilted rail ends to a depth sufficient to insure a substantial residual thickness of weld metal after surfacing, whether by surface grinding or by the present invention. I have found that to insure adequate durability a final depth of strip weld amounting to 40 or 50 thousandths inch is highly desirable, at least to a distance of about one inch from each rail end. In practice, the pre-ground depressed zone is made about one inch wide, by means of a vertical grinding wheel of that width, is located near the lateral center of the rail tread to coincide with the "riding strip" described below, and is extended longitudinally a sufficient distance to ensure, after finishing, residual weld metal.

Another important advantage of pre-grinding is that it enables the over-all length of the zone to be welded to be accurately determined by means of a straightedge, as mentioned above and described more fully below.

On the surface of most rails a "riding strip" is visible as a polished longitudinal strip about 1 inch wide usually located about in the center of the tread surface or slightly toward the outside of the rail. The riding strip marks the location of the principal bearing surface. If it were not for the modern practice of "canting" rails, the principal riding strip would be closer to the inside edge of the rail, causing it to wear down unduly and deform the tread surface, because the wheel treads are canted downward toward the inside of the rail. The practice of canting the rails inwardly centralizes the zone of application of the wheel load.

In practice, when measuring the longitudinal extent of batter by means of a straightedge spanning the joint, the length of the straightedge usually does not exceed eighteen inches and is usually so placed that the joint opening is at the midpoint of the straightedge. The preferred lateral position of the straightedge is in the center of the riding strip. In special cases of long and deep batter, real or apparent, a longer straightedge may be required, but instances where the built up zone equals or exceeds 8 inches on either rail end, or 16 inches over-all, are extremely rare. In fact, when the joint welding program is maintained adequately, i. e., when the number of linear inches built up per year exceeds the rate at which batter progresses, the average length of battered zone can be reduced year by year until it is brought within desirable economical limits, say 5 or 6 inches, over-all. But this desirable condition obtains on few roads, the average length of the built up zone throughout the United States probably amounting to 8 to 10 inches, over-all.

Former methods of predetermining the longitudinal extent of the welded zone are applicable to the present invention. The usual practice is for the welder or a special joint marker to span the joint with a straightedge prior to welding, as described above, and to estimate the extent of the weld by sighting under the bottom edge, being guided by experience and judgment, and then to mark with chalk the proposed terminal or run-off points of the weld.

Subsequently the welder, when strip welding, progressively builds up the surface, starting at one run-off point and proceeding across the joint to the other run-off. A sufficient thickness of weld metal is deposited to allow for subsequently smoothing the surface. With all methods of surfacing, the weld metal should be deposited to a height extending slightly above a straight line, extending from one extremity or run-off point to the other. In the present invention the excess height above said line should be sufficient to ensure continuous cutting action, i. e., preferably at least $\frac{1}{32}$ to $\frac{1}{16}$ inch. This excess height conforms to former practice, being subsequently reduced as described below.

Heretofore two general methods of finishing the built up surface have been practiced.

The earliest method practiced, still in use, is known as flattering, and is confined to oxyacetylene welding. In this method, the weld metal is applied in increments and hand hammered by the welder to an approximate finished surface as the weld progresses. The weld is then re-heated in increments and the welder holds a broad-faced heavy flatter on the surface while an assistant strikes the flatter with a sledge, thus producing as smooth a surface as is practicable by this method. This surfacing method is progressive but not continuous, proceeding in increments or stages, with alternate heating and flattering of successive patches. The flattering method of surfacing is adequate under certain circumstances not requiring a high degree of precision, such as in railroad yards. It does not produce adequate hardness, except in welds less than about 3 inches long on each rail end, because of its discontinuous nature, the heating of each successive area drawing or tempering the preceding area which has just been flattened and which has cooled below the critical temperature. During the operation the welder repeatedly "tries" the surface with a straightedge. It is apparent that differences in the slopes of the surfaces of the adjacent rails increases the difficulty of finishing the welded zone by flattering.

The method in more general use for surface finishing built up joints employs a surface grinder, the grinding being performed after the weld has cooled. The grinding wheel may be entirely manually controlled but for more precise work mechanical aids are provided for supporting and guiding the wheel. The procedure consists in alternately grinding and "trying" the surface with a straightedge, repeatedly, until the finished surface is produced. This process of finishing is discontinuous and the finished level is not progressively extended.

Unlike precision "shop" surface grinders, rail joint surface grinders are not adapted to mechanically control or conform the plane of the cutting action to a predetermined plane on the work. Former surfacing machines rest on carriages supported on the railroad rails, and their plane of surfacing is therefore influenced by any irregularities and lack of conformity of slope and height of adjacent rails. Precision of finish is dependent on the operator's skill.

Two difficulties, aside from the high degree of skill required, encountered in the surface grinding of built up joints as heretofore practiced are (1) the tendency of the grinding wheel of the vertical type, because of the downward pressure exerted upon it, to dig in and grind low at the extreme ends of the rail on "open" joints, and (2) the danger of grinding low on the lineally adjacent unwelded rail, just beyond the "run-offs" or extremities of the weld.

The latter tendency is present in the case of both the vertical and horizontal types of grinding wheels, and increases in cases where the tread surfaces, beyond the built up zones, slope downwardly at a depressed angle toward the joint.

The various conditions described above which give difficulty in finishing the surface by former methods are overcome by the present invention as will be brought out hereinafter.

Certain grinding machines which employ a "stop" or guide which operates by contact with one rail to prevent grinding below the level of such contact point while helpful in preventing low grinding at the ends of open joints are effective in producing a merging transition zone only in case the adjacent rail surfaces coincide in slope and height, a condition which seldom occurs in practice.

Heretofore, except for the aforesaid "stop," no attempt has been made mechanically to control with precision the plane of the finished surface with regard to causing it to merge with the lineally adjacent unwelded rail surfaces, the condition of the product having been dependent on the conformity or rather lack of conformity of the slopes of the adjacent rail surfaces (to each other and to the desired slope of the finished built up surface), and on the skill and judgment of the operative.

Moreover, most of the grinding machines which are powerful enough to produce at a sufficient rate to be practicable for out-of-face repair operations, i. e., the surfacing of consecutive joints in track, are necessarily expensive and very heavy and cumbersome, requiring two to five men to lift them on and off the track, a difficult performance which must be repeated frequently to clear the track for traffic.

As a preliminary to grinding it has been customary to handhammer welds made by the gas process while they are hot and plastic from the welding operation, but weld metal deposited by the electric process cools too rapidly for hammering to be effective. In the gas process welding has been intermittent, with frequent interruptions to hammer successive increments of the weld. During such interruptions the blowpipe burns continuously and, since the time required to hammer amounts to approximately the same time as that required for welding a given area, about twice the quantity of welding gas is consumed that would be required if the welding were continued without interruptions for hammering. Nevertheless, hammering is universally practiced in gas welding because it reduces the amount of grinding time and materials.

The surface of the repaired joint should be and has been, when sufficient time and skill have been employed, finished so that a straightedge placed on it longitudinally coincides with the surface within limits not exceeding plus or minus 5 thousandths of an inch, and this practically straight surface should extend along both rail ends to the ends of the welded zones or run-off points.

Since excess height of deposited weld metal is not a disadvantage but if anything an advantage to oxygen cutting, among the advantages of the present invention are that it obviates the hammering of gas welds thereby enabling the full potential linear welding speed to be attained.

For example, whereas the improvement of strip welding resulted in an average linear welding speed (for gas welding) of one inch per minute as compared with the former average speed (when full-ball welding) of ½ inch per minute, the welding speed made possible by the present invention amounts to 2 inches per minute, for a given (customary) size of blowpipe consuming 70–80 cubic feet each of oxygen and acetylene per hour.

The linear speed of welding in repairing battered rail joints has a direct relation to the cost of welding labor but a much larger effect on the labor cost of the operation as a whole because of the fact that a welding gang employs a large amount of unproductive labor. Other related factors are discussed more fully hereinafter.

When using the oxygen cutting apparatus for purposes requiring a smooth finish or for shaping to precise dimensions, it is necessary to use a cutting machine consisting of a cutting blowpipe mounted in a fixture. When a straight line cut is desired the fixture is usually a carriage adapted to travel on rails or guides. To produce a smooth cut surface not only must certain metallurgical requirements be met, such as the composition of the object, the degree of preheat, size of blowpipe, rate of cutting, etc., but also the mechanical construction and operation of the apparatus must be precise, within desired limits.

In former cutting machines the aforesaid fixture has comprised a carriage having a clamp for attaching the blowpipe and some form of driving mechanism; the carriage wheels have travelled either on the work itself or on a track supported on the work. The position of the blowpipe nozzle with respect to the work has been controlled by the blowpipe clamp. In other words, in order to regulate the distance of the end of the nozzle from the object, formerly a critical factor, the blowpipe has been moved with respect to its supporting fixture or carriage. A similar relative movement has been required to adjust the angular position of the nozzle, either by an angular movement of the clamp or by an adapter connection between the blowpipe and the nozzle permitting an angular adjustment between them.

Such prior arrangements, while effective for prior uses, are not adapted for the purposes of the present invention because of the non-conformity of the surfaces of abutting rails to each other, the differing requirements for consecutive joints, the degree of precision required, and the desirability of speed in adapting and adjusting the apparatus in position at each joint, in order to avoid waste.

The present invention includes several cooperating novel devices which enable the principle of oxygen cutting to be used advantageously for surfacing built up rail joints and similar purposes.

The principal novel devices included in the invention are briefly as follows: (1) a second fixture, intermediate between the blowpipe fixture or carriage and the rail joint; (2) adjustable supporting devices attached to the second fixture to adapt the apparatus quickly and precisely to the individual requirements of successive joints, these devices including adjustable gages.

An important advantage of the preferred form of apparatus from the standpoints of safety and speed of production is the fact that it is positioned and operated without clamping or otherwise fastening it to the joint or track structure—an important distinction from former cutting machines used for roughly trimming or cropping rails.

In the annexed drawings illustrating the invention:

Fig. 1 is a side elevation, partly broken away, of the preferred apparatus, in operating position at a rail joint;

Fig. 2 is a fragmentary plan view and Fig. 3 is a fragmentary front elevation, both partly broken away and partly sectioned, of portions of the said apparatus which, in operation, are positioned over, or closely adjacent to the side of, the rail joint being surfaced, a partly surfaced rail joint being also shown; and Fig. 4 is a view in rear elevation showing the said apparatus, partly broken away, together with a broken away portion of the associated rail head.

The proportions and dimensions of the illustrative apparatus may be estimated by comparison with the railroad rail in Fig. 1, which is 6¾ inches in height, its base being 6 inches wide and its head about 3 inches wide.

The apparatus illustrated weighs about 75 pounds. Auxiliary fittings, not shown, such as handles and wheels for conveying the apparatus from joint to joint, may weigh an additional 25 to 35 pounds.

All parts of the apparatus are desirably steel except as otherwise specified, or where the material is obviously not steel, for example, the blowpipes. The location of welds in the construction is usually indicated in the drawings but in some places omitted for the sake of clearness.

Customary drafting expedients are used in Figs. 2 and 3 to fully reveal the construction. For example, in Fig. 2, the left gage assembly 9 (on the right in the view) is shown in section through the plane indicated by section lines $a$—$a$ in Fig. 3; similarly with regard to the beam slide, Fig. 2 shows the view at the section lines $b$—$b$ in Fig. 3; and the left gage assembly 9 is shown in section in Fig. 3, the plane of the section being considered to pass only through the broken away portion of the gage beam 8 which contains the said left gage assembly 9. In some cases parts of the structure are omitted for clearness, for example, in Fig. 4, the beam 8 attached to the right front post housing is omitted, likewise the blowpipe, etc.

The compactness and light weight of the apparatus are in advantageous contrast to the sizes and weights of grinding machines which are capable of surfacing an equivalent amount of metal at comparable speeds, the latter weighing from 300 to 1500 pounds.

Referring to Fig. 1, the surfacing agent is a jet of oxygen issuing from and directed by the cutting tip or nozzle 1 of the cutting blowpipe 2 along the axis of the nozzle orifice in the direction indicated by the pair of parallel broken lines extending from the nozzle orifice across the top surface of the rail head. The geometric axis of the cutting jet is caused to move in a predetermined plane which is slightly above and parallel to the plane of the finished surface produced by the cutting action. In its preferred form, the entire apparatus constitutes a cooperating combination of gages and fixtures which predetermine and control (1) the plane of the finished surface so that the said plane shall pass through and include any predetermined longitudinal line through the built up zone including the line extending from the center of the riding strip on the rail at one extremity or run-off point of the weld to the corresponding point at the other run-off, and (2) the angle or tilt of said plane, with respect to the vertical axis of the railroad rail, including the preferred angle such that elements of said plane passing through said central points at the run-offs and normal to the said central line shall be tangent to the rail surface.

The cutting jet is preferably directed transversely across the rail and parallel to the said plane, the axis of the jet being parallel or at a slight angle to the said normal lines, or elements of the finished plane surface, and its position and movement controlled so that the surface produced by the cutting action coincides with the said plane.

The principal application of this preferred form of the invention is in the surfacing of strip welds. Such welds are preferably located so as to conform in position on the rail tread with the principal riding strip, which is usually located at the center or between the center and the outside edge of the rail as hereinafter described.

The present invention, with or without obvious desirable modifications in apparatus, has new and useful applications for other industrial uses, similar to that described, for the purpose of producing smooth heat treated load bearing surfaces and similar objects, with or without initially building up or coating said surfaces with weld metal. I am not aware of any prior method and apparatus for predetermining and controlling the plane of an oxygen-cut surface in deposited weld metal, or for the purpose of shape-cutting deposits of weld metal.

In all known prior successful oxygen-cutting operations, except those of the roughest or crudest type such as for demolition purposes, or for rough trimming, the tip of the cutting blowpipe, or nozzle, from which the oxygen jet emerges and which controls its direction, scope and magnitude of effect, in contradistinction from the present invention, has been located closely enough and directed at such an angle to the surface to be cut, so that the pre-heating flames, which issue from the same cutting tip, have been capable of pre-heating the nearest edge of the cut surface to the kindling or requisite cutting temperature, and of maintaining said edge at the proper temperature throughout the progress of the cut.

By proper pre-heating temperature, for the purposes of the present invention, is meant the temperature to which the nearest edge of the cut surface must be raised, at the instant the oxygen jet impinges upon it, not only to maintain continuous cutting but so that the resulting cut surface shall be smooth and free from grooves, for it is known that such a correct pre-heating temperature is a critical factor in obtaining a smooth cut and in preventing grooving.

In the preferred mode of the present invention, wherein the cutting oxygen is directed from the inside toward the outside of the rail, as illustrated in Fig. 1, it is seldom possible to space the cutting nozzle closely enough to the strip weld to enable it, unaided, to produce the required pre-heating temperature. The reason for this is explained as follows:

When used for surfacing strip welds the cutting nozzle should have an oxygen orifice diameter in the range 0.06–0.081 inch. In the standard cutting nozzles of these sizes the pre-heating orifices, usually four or more in number, surrounding the oxygen or cutting orifice, have a diameter in the range 0.036–0.046 inch, and the inner cones or principal heating zones of these heating flames usually do not exceed $\frac{1}{4}$–$\frac{3}{8}$ inch in length, measured from the end of the nozzle to the end of the inner cone. Therefore, the standard cutting nozzles in the above feasible sizes are ineffective by themselves properly to pre-heat the strip weld, for the end of the nozzle cannot be brought closer to the inside edge of the strip weld than the inside edge of the rail, and therefore the inside edge of the strip weld is usually $\frac{3}{4}$ to $1\frac{1}{2}$ inch from the nozzle. Moreover, much of the pre-heat is ineffective because the angle of incidence of the flames to the rail surface is extremely oblique, in fact, practically tangent thereto.

To overcome this difficulty, the present invention employs auxiliary pre-heating such as may be provided by an auxiliary oxyacetylene pre-heating flame or flames, preferably by means of a separate, welding type, blowpipe of suitable size and suitably located with respect to the angle of incidence and the distance from the end of the cutting nozzle to the point to be heated, to properly pre-heat the strip weld to produce a suitable cut surface.

The device for auxiliary heating may comprise one or a plurality of nozzles, and may be mechanically attached, preferably adjustably, to the cutting blowpipe, or to its nozzle, or to its support, and may be supplied either from the same source as the cutting nozzle, or independently. The attached pre-heating arrangement has utility in cases where a succession of identical or closely similar cuts are to be made.

In some cases auxiliary pre-heating may be dispensed with, as when the cutting is synchronous with the welding and close to it; or, for example, where the cutting jet is directed from the outside of the rail toward the inside and the strip may, in consequence, be close enough to the side of the rail and close enough to the heating flames of the cutting nozzle for them to be effective.

The action of oxygen-cutting depends upon the combustion of the metal and the blowing away of the resulting oxide by the oxygen jet and, to a lesser extent, upon the melting and blowing away of metal contiguous to the consumed metal. The utility of the action depends largely on the fact that the oxide of iron is fluid at the cutting temperature.

The present invention for surfacing built up rail surfaces and similar objects is therefore distinguished from former methods of surfacing which have employed either (1) plastic deformation or hot working at a red heat or higher temperature, or (2) abrasion at ordinary temperatures, by the fact that it operates by oxidation or chemical reaction, and by melting or change of state, coupled with the removal of the products of such processes.

For the above reasons the term "cutting blowpipe," as used herein, is defined as any apparatus or tool by means of which metal is usefully shaped or surfaced by changing its chemical composition or physical state and by blowing away or otherwise removing the products of the changes, such as, for example, any apparatus for usefully employing a high temperature source of heat and a jet of oxygen or other gas, active or inert; and a "cutting machine" is defined as a combination of a cutting blowpipe and a fixture for supporting said blowpipe and guiding its movement and, optionally, for moving it.

In some cases it may be advantageous to operate the invention so that it produces a partial cut, for example, one not extending throughout the entire length of the welded zone, and to finish the remaining portions of the weld by other means. Such partial oxygen-cutting may have utility in cases of very long welds.

The invention is further distinguished from former apparatus for finishing the surface of built up rail treads by the fact that the surface is finished to a predetermined level or plane substantially coextensive with the lineally adjacent unrepaired rail surfaces continuously and progressively, beginning the operation at one run-off or extremity of the repaired zone and proceeding to the other.

In cases where the inventions described herein are employed and the resulting surfaces may accidentally or otherwise be imperfectly produced, and may be rough or grooved in part or in whole, or may be too high in part or in whole, or incomplete in length, such uses having a certain utility come within the scope of the invention even when used in combination with other means of surfacing.

Referring to the illustration, the principal parts of the preferred form of apparatus will first be briefly described. The cutting blowpipe 2 having a nozzle 1 is integrally mounted in a three-wheeled carriage supported on rails 3 and 4. The rails, in turn, are supported on a tubular frame 5, adjustably supported by posts 6, in the post assemblies described hereinafter, at three triangularly related points. Two of the points are on the railroad rail in proximity to the joint being surfaced but outside of the cutting action, one on each side of the weld, while the third point is located on the ballast, ties, or ground. This third support may be either on the inside or outside of the rail being surfaced, depending on whether the surfacing jet is directed from the inside or from the outside of the rail. A motor assembly 7 drives the cutting machine along its carriage rails at a controlled speed while the cutting blowpipe operates, thus progressively surfacing the built up joint in a plane which is predetermined and controlled by means of gage beam 8 and gage assemblies 9.

The methods of predetermining, controlling, and producing the finished transition surface are described in detail after the following complete description of the specific apparatus illustratively shown in the drawing.

The blowpipe is of the type known as a machine cutting blowpipe and its nozzle is co-axial with its handle. The frame 5 is designed to extend below the level of the track surface, and is suitably braced with cross and diagonal tubular members, as illustrated, to form a rigid structure.

The illustrative apparatus is designed to be set up on a joint, adjusted in position, and operated, by an operator standing above the machine, straddling it and facing the joint, that is, in the direction in which the cutting nozzle points. The parts of the machine over the rail or adjacent to it are therefore referred to as the front parts, and left or right respectively with reference to the operative's position, and are so designated herein. The operative may optionally stand facing the joint somewhat to the left or right of the machine while cutting, depending on individual preference and convenience.

The frame 5 is desirably so constructed and positioned as to be out of direct contact with, and uninfluenced by, the heat emanating from the built up joint and the heat of the operation, so that no shields are required.

The frame 5, also referred to herein as the "second fixture," consists of tubular steel members of the form shown, which are joined to one another by welding.

Viewed from the above-mentioned position of an operative standing over the positioned apparatus, facing the rail joint and looking down, the frame 5 is U-shaped, being formed principally from a single bent tube 5a. The legs of the U are parallel, with center lines substantially twenty-seven inches apart. The distance from the line of the front posts 6 to the rear post 6 is also substantially twenty-seven inches. The front ends of the side members or legs of the U-shaped member 5a are bent upwards, at an angle of about 45 degrees, as illustrated in Fig. 1, and welded to front post housing tubes 73. Additional diagonal tubes 5b are welded as shown to stiffen the structure to prevent deflection. Two cross tubes 5c, as shown, complete the frame construction. The axes of the front post housings should be approximately normal to the axes of the main bodies of the associated side portions of the tube 5a.

The rear post housing tube 73 is attached to the rear of the rear member or base of the U-shaped frame tube 5a at its midpoint, by welded flanges as indicated in Fig. 4. The axis of the rear post housing 73 should preferably point down and backwardly at an inclination of 1 to 2 degrees to the plane of the front post housing axes in order that it shall be approximately vertical when in its usual operating position, that is, when surfacing the joints in level, tangent track, from the inside of the rail. One of the functions of frame 5 is to support the carriage rails 3 and 4 which are positioned rigidly but adjustably, the rear rail 4 by adjusting screws 17 with respect to rail plates 18, and the front rail 3 by similar screws and plates as illustrated. In the process of construction, the riding edges of the rails are made precisely parallel to each other by means of the adjusting screws, preferably within a tolerance of plus or minus 0.003 inch from end to end of the rails, by the aid of a surface gage working from a plane reference base above which the frame is set at a convenient height in a plane parallel or nearly parallel to the reference base. The relative heights of the carriage rails are designed with reference to the parts of the carriage and the frame members so that the axis of the blowpipe will travel in a plane approximately parallel to the plane of the main tubular frame, and so that the axis of the blowpipe will intersect a line joining the bottom bearing points of the two front supporting posts 6 when the latter extend about three-quarters to one inch below their tubular post housings 73.

The cutting blowpipe 2 forms the main member of the carriage frame and also serves as the axle of the front wheel 19 which comprises a sealed ball bearing about three inches in diameter and about ¾ inch wide. A bushing, not shown, is made to fit tightly between the blowpipe and the ball bearing. The blowpipe should be positioned longitudinally so that the end of the cutting nozzle is about 1¾ inches from the plane of the axes of the front posts. The gases are supplied to the blowpipe in the customary manner, via flexible hoses and 90 degree elbow connections, in such a manner that the hose and connections clear the rear post as the blowpipe is traversed in its carriage.

The lateral distance between the end of the cutting nozzle 1 and the nearest edge of the head of the rail is preferably ⅛ to ¼ inch and is preadjusted and maintained at this distance by a pair of aligning screws 52 projecting toward and pressing against the side of the rail head, said screws being fixed about 15 inches apart to a member 53, which functions also as a nozzle guard, positioned longitudinally beneath and close to the nozzle, and fixed at its ends to the main frame. Said nozzle guard may be a length of 1 x 1 x ⅛ inch angle iron having an expansion joint, not shown, located preferably near one of its ends for the reason that it is otherwise subject to buckling, being the nearest member of the apparatus to the heat of the operation.

The blowpipe handle is fitted near its rear end to the midpoint of a cross member 20, which may be 1¾ x 3/32 inch tubing, to which it may be rigidly fastened by brazing or preferably by a clamp 55. At each end of the cross member 29 are mounted flanged wheels 21, screwed to plugs in the ends of tube 20, in such a position that their bearing treads will track when rolled on rear rail 4. Said rail 4 comprises a special angle iron constructed straight and true having the bearing corners of the vertical leg relieved to bear suitably against the sides of V-shape grooves forming the treads of the rear wheels.

Precision finish of the bearing edges of the rear rail and of the rear wheel treads is requisite to obviate a vertical deviation of the axis of the blowpipe from the plane of its operating travel. However, some lateral movement or play is permissible; for example, the rear wheels may desirably have a slight lateral play on their bearings. Again, a deviation from lateral parallelism is permissible between the riding edges of the front and rear rails, having no effect upon the plane described by the axis of the blowpipe in its travel.

The front rail 3 is a 1½ x 3/16 x 24 inch beveled straightedge adjustably fastened to angle iron supports 18 welded to the front cross tube of frame 5. Supports 18 consist of three short pieces of angle iron, one at each end of the straightedge and one at its center. The upright flanges of the angles 18 are vertically slotted to accommodate fastening screws threaded into the straightedge. Two vertical adjusting screws 17 are provided, one at each end of the straightedge, and these preferably are provided with suitable guards as illustrated. The two end angles 18 should be welded not only to the front cross tube but also to the side members of the frame 5.

While the apparatus as described above may be operated manually with good results it is preferable to control the movement of the blowpipe mechanically by a device such as the spring driven motor assembly 7. The motor shown is identical in design, with slight modification of the speed adjusting lever and screw, for compactness, to a spring driven Victrola phonograph motor. The essential parts consist of a spring, enclosed in casing 50 and driving a main worm gear 22, which engages a main worm 23. The worm 23, in turn, actuates governor worm gear 24 and governor worm 25 and governor 26. The governor has a speed control lever 27, the position of which is adjustably controlled by a speed control screw 28. The motor is started or stopped by retracting or advancing rod 29 which releases or engages pin 30 in collar 31 fixed to the top of the main worm shaft.

The movement of the main worm gear 22, Fig. 4, as it is driven by the motor spring is shown by the arrow. The rotating worm gear moves the carriage along its rails from left to right by engaging a sponge rubber track 32 which is cemented to a track base 33. The track base may be an angle iron or channel with a trough shape to support the sponge rubber laterally as well as to position it.

The sponge rubber track should be about ¾ inch thick and 1 inch wide, in section, and have a top surface layer of solid live rubber about 1/16 inch thick cemented to it.

The motor assembly 7 is fastened by its base 34 rigidly against the top of a thin-walled sheet metal motor box 35 which acts as a motor mount and also protects the mechanism against dust and moisture.

The motor is positioned at a suitable height to permit clearance between the blowpipe handle and the track base 33 which is detachably fastened to and supported at its ends by track base supports 36 fixed rigidly to the main frame. It is necessary to detach the track base 33 from its supports to permit removing the carriage. Adjusting screws 37 enable the track base 33 to be adjusted at a suitable height to permit proper traction between the worm gear 22 and the rubber track throughout the length of travel of the carriage which in the model illustrated amounts to about 18 inches. Wider models may be constructed to permit cutting longer welds but such are exceptional.

A clutch mechanism is provided for convenience in moving the carriage freely back and forth along the carriage rails. Referring to Figs. 1 and 4, the illustrated construction shows the motor box connected at its front end to the blowpipe 2 by means of motor box hinge 38 and split annular blowpipe clamp 39 which is fastened to the blowpipe handle 2 in front of the ball bearing front wheel 19. The hinge 38 permits the motor and main worm gear to be raised out of contact with its rubber track 32 by means of a clutch mechanism mounted on a shelf 40 extending from the rear of the motor box. The clutch mechanism comprises a clutch lever 41 pivoted at the top of clutch post 42 and acting through a fulcrum point on the head of the clutch spring axis screw 43 which passes freely through shelf 40 and is screwed into nut 44 (which is attached to cross member 29), to a suitable extent to compress clutch spring 45, thereby regulating the pressure to a suitable degree between shelf supporting screws 46, which are also adjustable as to height. The points of the said screws are positioned in recesses in the rear wheel frame, as illustrated in Fig. 4. Clutch spring 45 is contained between suitably shaped washers 47 and normally exerts a substantial downward pressure, principally applied through supporting screws 46, holding the motor box and its members firmly in position on the carriage. To raise the worm gear out of contact with its rubber track, clutch lever 41 and its cooperating handle 48, projecting from shelf 40, are pressed together, causing shelf 40—and the motor—to rise, and compressing clutch spring 45.

The worm gear should be depressed only deeply enough, about ⅛ inch, in its rubber track to give adequate traction.

The described motor and carriage driving mechanism have the distinct advantages for the special purposes of the invention of affording reliable, positive, steady, adjustable linear movement, and more than adequate power and speed range. Machines similar to that illustrated have operated in track for months, through the heat of summer and under sub-freezing temperature, without any maintenance or adjustments except to vary the speed and to adjust the gage blades. However, it is advisable to check the cutting (travel) speed several times a day, but this operation requires no delay, being done while actually producing a cut by timing the travel between two reference marks a known distance apart on the tip guard and making any necessary adjustments by fractional turns of the speed control screw 28.

It is advisable to wind the spring motor after surfacing about every ten joints and this is done by means of a winding handle 49, projecting from the front of the motor box, which is preferably unscrewed and detached between windings.

Referring principally to Figs. 3 and 4, the supporting post assemblies are constructed as follows: A pipe nipple 70, having an inside diameter such as to provide, when unrestricted, a loose fit on post 6, is threaded at its upper end and screwed tightly into a threaded coupling or socket 71 which is welded to a washer 72, as shown. The bottom portion of nipple 70 is slit to a distance of 3 or 4 inches from its lower end. The nipple assembly is then positioned in the tubular post housing 73 and oriented so that the plane of the slit in the nipple is normal to the axis of post clamp screws 74. Said screws when progressed in their respective nuts 75 by hand wheels, not shown, press the split portion of the nipple against post 6. Said nuts 75 are welded to tubular housings 73 which are provided with clearanced holes to permit the passage of screws 74. The respective locations of nuts 75 on the three post housings 73 are preferably as illustrated, each being about one inch from the bottom of its housing and oriented as shown. With the nipple assembly properly oriented, the washer 72 is welded to housings 73 as shown.

Washers 76, adapted to fit inside housings 73 and having an inside diameter providing a loose fit for nipple 70, are welded to the lower extremities of housings 73, to center the split nipples and provide a support against the tightening or clamping action of the split nipple on post 6 when screw 74 is progressed. When the screw is retracted the split nipple springs open and releases post 6 allowing it to slide freely. The nipple 70 should be of sufficient length to project below housing 73 when assembled, thus permitting the nipple to be unscrewed by a spanner wrench.

The above described post assembly has advantages over other possible constructions, such as, for example, a simple set screw pressing directly against post 6 or as, for example, adjusting the height of post 6 by a screw feed. A set screw has the disadvantage of tending to wear a depression in post 6 eventually resulting in a tendency to cause the post to move up or down when the set screw is tightened. Moreover, the described split nipple is caused to grip the post effectively under a much less pressure of the screw than would be required to clamp the post by the screw directly. A screw feed adapted to post 6 would not be self-positioning as in the described construction and would be much slower to operate.

The construction of the gage beam 8 and its related parts, and methods for its installation and periodic adjustment, are as follows:

Referring to Figs. 1, 2 and 3, the construction of the gage assembly 9 permits a vertical and also a tilting adjustment of the gage blades or bars 10 with respect to the gage flanges 60, locking screw 61 being threaded into flange 60, said screw passing through a vertical slot in gage blade 10. To further stabilize the adjustment, gage blade adjusting screws 62, threaded through projections on gage slide 63, are maintained in contact with the top surface of blades 10.

It is desirable to case harden the knife edges of the blades 10 and the surfaces of all parts of the entire apparatus at points where adjusting screws bear on them, as well as the bearing points of all adjusting screws. It is unnecessary to harden carriage rail and wheel bearing surfaces or edges, or the sliding surfaces of the gage beam and its parts.

Beam 8, with its hinge assembly 11, including flanges 56 attached, should preferably be installed in the frame 5 so that the plane of its bottom or gage slide contact surfaces is parallel to the plane of the path of the axis of the cutting blowpipe nozzle, i. e., to the plane of the cut surface, and at a height above said cut surface such that the gage blades 10 may rest on it when they are in a median vertical position in their gage assemblies, the latter being clamped to the gage beam. A suitable fixture is of assistance in thus positioning the beam, which at the same time should be aligned with the centers of the front posts 6, hinge flanges 56 being placed in contact with right front post housing 73, while beam slide 14 is extended and clamped by nut 16 in position under left post housing flange 57. In this position, screws 15 are set in contact with the beam slide, and the beam slide held firmly in contact with the said screw by means of a C clamp. Flanges 56 are then welded to right front post housing 73. Care should be taken during the welding operation that the heat does not pass to the frame and warp it, by wrapping the housing and adjacent members, including the hinge assembly, with cloth kept saturated with water.

Slight displacement of the beam and its gages from its theoretical position during its installation is readily corrected by adjustments of the gage blades and of the beam stop screws 15.

The first correcting adjustment is made for the purpose of making either one of the bottom slide contact edges of the beam vertically parallel to the bearing edge of the front carriage rail, using a surface gage in the manner described for making the carriage rails parallel. During this correction the stop screws 15 should be readjusted to make contact with beam slide 14, after which the aforesaid C clamp should be applied to hold the beam slide firmly against the stop screws, preparatory to making the final adjustment of the gage blades, as follows:

A rail joint of the type to be surfaced, which may be an actual joint in track, is strip welded in the usual manner. The apparatus is then set up in position at the joint, and a cut made in the manner hereinafter described for production operation. Except by coincidence, the cut surface will not be a true transition surface merging with the rail treads at the run-off points.

Without moving the position of the apparatus with respect to the joint, the beam 8 is then swung down horizontally and its beam slide 14 again clamped under stop screws 15, gage blades 10 being loosened on their flanges while so doing. The gage assemblies 9 are then positioned at some convenient distance apart within the length of the cut and clamped to the beam. The knife edges of blades 10 are then allowed to make firm and even contact with the cut surface, from which any adhering scale should be removed, and clamped in position on flanges 60, screws 62 being adjusted to make contact with the top surfaces of the gage blades. The machine is then ready for production operation, as described below.

In operation it is optional for the welder to operate the cutting machine upon completion of a weld, or for the machine to be operated by a seperate operative, but in either case it is preferable to perform the cutting operation as soon as practical after welding, and for the interval between welding and cutting to be reasonably uniform, i. e., one to three minutes. If for any reason the weld should become cold before cutting it is preferable gradually to warm it throughout with the pre-heating blowpipe before cutting.

In production the cutting machine is set up at a welded joint by first placing it approximately in position resting upon its three supporting posts 6 which temporarily remain clamped in the same position in their housings which they occupied while the previous joint was being cut, the two front posts being approximately equi-distant from the respective ends of the weld while the rear post is set on a small detached flat plate about 3 inches in diameter equipped with short legs, which in turn is set firmly on the ballast or on a tie.

Throughout the operations of adjusting and cutting, the aligning screws 52 should be maintained in contact with the sides of the rail heads at the joint. On some curves, manual pressure may be required to maintain alignment when cutting from the inside of the high rail, or from the outside of the low rail.

Referring to Fig. 3, the adjustments, preparatory to cutting, which are necessary to predetermine and control the plane of the cutting action are next accomplished by lowering the beam 8 to a horizontal position, about hinge 11, and sliding the two gage assemblies 9 into position, each at its respective end of the weld, so that the gage blades 10 rest on the rail tread immediately adjacent to the ends of the weld. The gages are then locked in position by tightening gage lock nuts 12 on gage studs 13. The extensible beam slide 14, sliding between guides 64, is then extended under the beam stop screws 15 where it is locked in position by beam slide lock nut 16 operating on beam stud 77. The two front supporting posts 6 are then unclamped, to slide freely, whereupon the frame becomes supported upon the two gage blades 10 and the rear post 6.

The only remaining adjustment consists in tilting the frame up or down on the rear adjustable supporting post 6 until the said knife edges become tangent to the rail surface at the transverse midpoint of the strip weld, said weld having been located as previously described to coincide with the principal riding strip on the rail surface. The rear post is then clamped in position and then the front posts are clamped. The technique of adjusting the machine is easily acquired and the precision of the tilting adjustment may be checked for accuracy by noting the manner in which the car wheels subsequently bear on the finished strip weld. The strip weld being preferably located near the center of the rail, the correct amount of tilt is indicated by an even distribution of contact on the cut surface. If the outside edge receives the principal wear the tilt should be decreased accordingly, and vice versa. Theoretically, on tangent (straight) track the said tilt will have a slope of 1:20 to the horizontal, because of the prevalent cant of the tread of the car wheels; and, when the rail is canted 1:20, the plane of the cut will be normal to the vertical axis of the rail.

The gage beam extensible slide 14 is then retracted and the beam 8 swung upright, the machine now being supported on the three posts 6, in correctly adjusted position.

The foregoing operations, consisting of adjusting the gage slides, and adjusting the tilt, and swinging up the gage beam require a total time of about one-half to one minute and may be performed by either the operator, or his helper, alone.

Operating the clutch mechanism to release the carriage from its track, the blowpipe in its carriage is then wheeled to the left into its starting position, so that the cutting tip or nozzle 1 is directed across the rail about one inch from the starting end of the surfacing action.

Before starting the cut the zone on the unwelded rail immediately adjacent to the starting end of the weld is pre-heated for about 15 to 20 seconds with the auxiliary pre-heating blowpipe to raise the temperature of the rail contiguous to the weld to a bright red heat.

As soon as the proper pre-heating temperature has been reached, the motor is started by retracting rod 29 and the cutting blowpipe valve opened, whereupon the pre-heating flames of the cutting blowpipe are automatically lighted by the auxiliary flame. This valve, not shown, known as a V-block, is standard equipment for similar operations and is adapted to operate simultaneously the cutting oxygen jet and the cutting blowpipe pre-heating flames which have previously been adjusted, according to well known procedure for such apparatus. The cutting action begins as soon as the oxygen jet impinges on the starting end of the weld, and continues without interruption until the other end of the weld is reached, either at the joint opening or at the other run-off point in case of a tight joint. When reaching a joint opening, the cutting action ceases until the progress of the carriage has caused the oxygen jet to again impinge on the weld, whereupon the cutting action again begins and continues without interruption until the run-off point of the weld is reached.

It should be noted that in contrast to the grinding method of surface finishing which usually grinds low in the vicinity of an open joint, as already explained, the present invention ensures the production of a straight, smooth surface regardless of the width of the space between the rails at a joint.

As the cutting progresses, the flame of the auxiliary pre-heating blowpipe is directed against the aforesaid near edge of the weld, to pre-heat it progressively ahead of the advancing cutting jet. The auxiliary blow pipe may vary widely in capacity but preferably has a capacity of about 70 cubic feet of each gas per hour. Care should be taken to direct the auxiliary flame slightly away from both the cutting jet and the parts of the machine and its frame. A satisfactory position and inclination of the auxiliary blowpipe nozzle 78 is shown in Figs. 1, 2 and 3. The auxiliary blowpipe is preferably manually operated but may be guided by resting its handle or stem against the motor box. A proper pre-heating technique is an important factor in obtaining good results and is easily acquired. The pre-heating temperature is readily adjusted by controlling the distance between the point of application of the pre-heating flame and the cutting jet. At the start of the cut the auxiliary flame should be directed at the near edge of the weld and held stationary until the oxygen jet arrives within ¼ to ½ inch of it, whereupon the auxiliary flame should be moved ahead gradually until it is 1 to 3 inches from the oxygen jet. The proper technique is indicated when, on the one hand, the near edge of the cut is not heated so much as to cause it to melt excessively under the action of the cutting nozzle flames and when, on the other hand, the time lag between heating and cutting is not so great as to nullify the pre-heating action, as indicated by a grooving action of the cutting jet.

When the auxiliary flame reaches the finishing end of the weld, the cutting jet then being one to three inches away, it should be held stationary and directed at the zone on the rail immediately adjacent to the end of the weld, to bring the rail metal to a red heat in a like manner as described for the start of the operation. Throughout the pre-heating operation care should be taken to avoid heating the weld excessively to avoid a scooping action of the cutting jet.

When the cutting jet reaches the end of the weld the cutting action automatically ceases, the cutting jet being tangent to the rail surface, but the cutting blowpipe valve should be immediately closed to prevent waste of gas; then the motor should be stopped and the auxiliary flame shut off.

This completes the surfacing operation, except for chipping off any cutting slag which may adhere to the rail surface.

Good results were produced while surfacing a strip welded rail joint as described above when the cutting blowpipe and its nozzle were, respectively, an Oxweld C-12 and a Series 1502-No. 6 or No. 8 solid copper nozzle having six pre-heating orifices. Comparable capacity two piece nozzles with four pre-heating orifices also produce good results. With the said No. 8 nozzle, which is the preferred size, good results were obtained with gas pressures, at the regulators, of 35 pounds for oxygen and 3-5 pounds of acetylene, the oxygen and acetylene consumption per hour under these conditions being 195 and 20 cubic feet, respectively. At the preferred cutting speed, under the above conditions, of 8 linear inches per minute, the cutting gas consumption in cubic feet per linear inch surfaced is theoretically, for oxygen, 0.41 and for acetylene, 0.04. Actually, the gas consumed by the cutting blowpipe amounts to about 0.55 cubic feet of oxygen per linear inch surfaced and 0.055 cubic feet of acetylene, due to the fact that in practice the blowpipe burns for a short interval at each joint without cutting. The oxygen pressure, at the regulator, may vary in the range 25-55 pounds, with the said No. 8 cutting nozzle, but a pressure in the range 30-40 pounds is preferred. The linear cutting speed may vary in the range 4-18 inches per minute, using a No. 8 nozzle, but the preferred speed is about 8 inches per minute to produce the smoothest cut surface.

The considerable latitude in size of nozzle, gas pressure and cutting speed, and especially the large permissible latitude in the capacity and positioning of the auxiliary pre-heating blowpipe and in the time interval between welding and cutting, all have utility, especially in connection with controlling the hardness and other physical characteristics of the finished product.

Comparing the amounts of gases consumed by the two methods in building up and surfacing battered rail joints having an average length of built up zone of 10 inches, the former method of strip welding involving hand hammering followed by surface grinding consumes about 35% more acetylene and about 16% less oxygen than the method of the invention, including gas consumed in strip welding, cutting and auxiliary pre-heating.

The invention therefore has a distinct advantage in economy of gases especially when it is considered that the acetylene is roughly twice as expensive as oxygen, when supplied in portable tanks. Moreover, it is obvious that the total number of tanks required per mile of track is less for the cutting method, an important consideration because of the necessity of handling tanks, to and from the job, as well as during the operation.

With this invention various types of gang organization may be employed for out-of-face repair work, one important determining factor being the average length of strip weld. When the average length is 4 to 6 inches, it is usually desirable for the welder to surface his own joints immediately after welding each joint, using his welding blowpipe for auxiliary pre-heating as described. In such cases the welding blowpipe may be supplied in the usual manner from a "set-up" of two manifold acetylene cylinders and one oxygen cylinder, set up on the right-of-way and provided with 100 feet of gas hose; the cutting machine may be supplied from a single acetylene cylinder and one oxygen cylinder, set up adjacent to the aforesaid cylinders and provided with 100 feet of hose. The set-ups are moved ahead when all joints within the scope of the set-up have been welded and surfaced.

When, however, the average length is say 8 to 10 inches or longer, either the above described procedure may be adopted or, preferably, two welding operatives may be employed, in proximity, each welding the joint on his own rail while a separate operative operates the cutting machine, employing a separate welding blowpipe for the auxiliary pre-heating. In the latter case two cutting machines are operated alternately, one for each rail, alternate joints being surfaced. The two machines are preferably connected through suitable Ys to one set of gas cylinders. While an assistant sets up one machine on a joint immediately after it has been welded and makes the preliminary aligning adjustments, the cutting operative operates the other cutting machine which has already been set up and adjusted on the next preceding welded joint on the opposite rail. Two assistants are preferably employed, one to set up and adjust each cutting machine. In the presently described case the welders, using blowpipes consuming 70 cubic feet of each gas per hour, each strip welds at a linear speed of 2 inches per minute, thus the two combined welding about twenty-four 8 inch or about twenty 10 inch joints per hour, a production rate approximately equivalent to the productive capacity of one cutting operative employing two cutting machines.

The high production rate made possible by the invention above makes it desirable to employ mobile outfits for transporting the gas cylinder rather than to use the set-ups previously described. For example, each welder's group of two acetylene cylinders and one oxygen cylinder may be transported continuously along the track on a three-cylinder track-truck; while two two-cylinder track-trucks may be used to transport the cylinders for supplying the cutting machines and the auxiliary pre-heating blowpipe; such trucks are standard equipment in some cases of prior practice.

Or, preferably, the above unit group of six acetylene cylinders and four oxygen cylinders may all be mounted on a suitable framework adapted to a crawler tractor. The tractor may also carry an electric generator for supplying power to operate a pre-grinder (when its use is indicated as previously discussed) and a slotting machine, the latter being required for trimming the ends of the rails, transversely.

An alternative novel combination procedure comprises building up the joints by the arc process and surfacing with the oxygen cutting machines as described.

The organization and equipment preferred for the combination procedure is similar to the last above described, namely, a crawler tractor is equipped with a belt-driven generator capable of supplying 300–400 amperes to supply current for one welding operative who can therewith strip weld at a rate of 4 to 6 linear inches per minute employing a ¼ inch diameter, coated electrode of a composition described herein- after. The four gas cylinders required for the two cutting machines can be carried on the same tractor which, however, for arc welding necessitates a much heavier tractor than for gas welding because of the greater weight of the arc welding generator.

It has been pointed out that the use of the oxygen-cutting apparatus of the invention comprises a controllable heat treatment which operates on the same principle as the heat treatment inherent in the strip welding process and differs therefrom only in utilizing novel special means and procedure for applying and controlling the heat. Similar factors are used to control the hardness of the product in both operations, such as the composition of the weld metal, the amount of heat applied and the rate of progression of the heat along the zone of repair. See in this connection U. S. Patents 2,186,966 and 2,186,967. The cutting is performed within a suitable period after welding, at a controlled speed and a coordinately controlled rate of heat input to cause the resulting surface to have a hardness within a desired range.

For the present invention the same composition of weld metal may be employed that was cited in the strip welding specification U. S. Patent No. 2,186,966; for arc welding the rod should be suitably coated; rod ingredients which induce cracking or are difficult to cut should be absent or kept to a minimum, most of such ingredients being well known.

When the procedure of welding and cutting and the weld metal are substantially according to that described above and with the post heating described below the resulting hardness is substantially the same as that resulting from strip welding according to the procedure cited in the above strip welding patent, namely, a hardness throughout the weld and adjacent rail metal amounting to 350–420 Brinell (55–65 scleroscope, after service). The structure of the weld metal and immediately adjacent rail having such hardness is composed of tough sorbite and troostite, principally the latter, with no soft pearlite nor hard, brittle martensite.

In the use of the apparatus of the present invention, as a desirable improvement, it is good practice to post-heat the unwelded rail immediately adjacent to the weld run-off points, as soon as the cutting operation has been completed, in the following manner. At the conclusion of the cutting operation the pre-heating flame is directed on the rail at the starting end, as described for pre-heating, to again raise the temperature of that zone to a red heat and then to do likewise at the finish end. Each such post-heating takes about 10 seconds and serves two purposes, (1) it hardens the unwelded rail adjacent to the weld to a hardness in the range 300–350 Brinell, and (2) it tempers the run-off zones of the weld which otherwise have a tendency to harden to the upper limit of the aforesaid range. The hardness of un-heat-treated modern rail is about 250–280 Brinell (40–45 scleroscope on nondecarburized tread surface cold worked by service). While the most desirable hardness for repaired rail joints is generally considered to be in the range 350–425 Brinell, the production of lesser or greater hardness is within the capacity and scope of the invention and often has use, especially for other industrial application than rail joint repair. The desired combination of the factors mentioned above to produce a given hardness should be determined by trial in any given case.

As brought out above, the invention has substantial advantages over prior apparatus; not only improving the surface finish, doing so more easily and with less expensive and lighter equipment than formerly possible, but, more importantly, speeding up and reducing the cost of the operation as a whole, including the welding, while at the same time improving the physical structural and hardness characteristics of the product.

The physical structure, especially of the arc weld, is improved by the invention by virtue of its function in re-heating and re-crystallizing the metal. In the case of the arc weld, the structure has formerly possessed a characteristic columnar structure, the grains tending to separate along vertical planes of inherent weakness. The heat of the cutting process of the invention causes a re-crystallization as more fully described below, and, by its concomitant beneficial controllable heat treatment, produces a uniform hardness of any desired degree. For this reason, the former post-heating at low temperatures (below the critical temperature) usually practiced with arc welding battered rail joints to improve their hardness is rendered unnecessary. Moreover, present indications are that the pre-heating formerly practiced with arc welding may also be eliminated by virtue of the present invention but this cannot be definitely stated until test installations have had more prolonged service.

An important benefit derived from the surfacing of rail joints and similar ferrous metal articles according to the present invention is the grain refinement resulting from the re-crystallization of the metal by the oxygen-cutting action. This re-crystallization and refinement is characteristic of ferrous metal that has been heated above the so-called critical temperature and then cooled rapidly to below said temperature. It is similar to the refinement of the rail metal in a zone adjacent to and underlying strip welds as described in the above-cited patent; but the grain size characteristic of a strip welded rail that has been oxygen-cut is substantially finer than that produced by strip welding or by any process for welding rails; moreover, the re-crystallization and refinement produced by oxygen-cutting, as described herein, is confined to a shallow zone, adjacent to and underlying welds of ordinary thickness, and including the weld layer, within the zone re-crystallized by the welding operation. Such secondary re-crystallization, of metal that has been cooled from a molten condition without hot working, is beneficial for two reasons, (1) because it breaks up the structurally weaker, dendritic, primary structure, and (2) because it refines the grain size.

Secondary re-crystallization is especially beneficial to weld metal deposited or produced by electric arc welding because the typically coarse, columnar dendrites characterizing rapidly cooled, relatively thin layers of arc welds, are inherently weak structurally, being inclined to intergranular fracture.

All of the above structural characteristics are readily seen and identified by microscopic examination. High power examination is desirable to observe the re-crystallization of the welds, preferably at a magnification of about 500 diameters, because the secondary grains are so small and because the primary structure often remains as a pseudodentritic pattern.

It is well known that grain refinement has a beneficial effect per se on the physical properties of metal, apart from the effect of other structural features, such as the size, distribution and arrangement of the iron carbide. For example, in the case of two steels having the same chemical composition and both being composed of, say, sorbite, or troostite, the steel having the finer grain size will be the tougher of the two and more resistant to plastic deformation, especially under conditions of repeated loading, i. e., its fatigue resistance is greater. High fatigue resistance is desirable in steel composing the treads of rails especially at the ends of the rails.

While it is preferable, for repairing battered rail joints by the present invention, to use it in combination with the strip welding procedure, yet the invention has utility for surfacing and heat-treating built up rail treads having a wider built up zone than is characteristic of strip welds. When a full ball weld, for example, is surfaced according to the present invention, the technique is the same as described above for strip welds, and the utility or advantages, as compared with surface grinding, for example, are similar to those already mentioned, viz., a desirable merging of the riding strip of the built up zone with the lineally adjacent rail surfaces, the prevention of low zones at the run-off points and at the junction of the two rails, and a desirable heat treatment of the weld. When surfacing full ball welds by the present invention it is preferable to surface a longitudinally central strip by oxygen-cutting as described, and then to surface grind the laterally adjacent welded zone to conform it to the general rail contour. In connection with gas welding the principal advantage from the standpoint of economy, of oxygen-cutting full ball welds is that such practice makes it feasible to eliminate the hand hammering formerly customary when using the gas process, thus enabling the welding speed to be doubled with attendant economies in welding gases.

From the standpoint of quality, the principal advantage results from the heat treatment. Full ball welding, whether gas or electric, when applied to the repair of battered zones in excess of about three inches long, as explained in the patent specification relating to the strip welding invention, results in an undesirable softening of the zone immediately adjacent to the rail junction, where batter begins. For reasons already explained herein and more fully discussed in the strip welding specifications, the progressive heating of the surface metal—according to the strip welding procedure and likewise the procedure of the present surfacing method—produces a desirable hardness extending throughout the length of the built up zone including the zone immediately adjacent to the junction of the rails.

In some cases, for example when surfacing full-ball welds on rail joints that may be consistent in respect to the conformity of the surface levels of adjacent rails to each other, there may be utility in operating the surfacing machine without the step of adjusting it to each joint, i. e., without the use of beam 8 and its appurtenances. The machine may be initially adjusted to produce a surface slightly higher than the desired transition surface, and the cut surface subsequently surface ground. The advantage in this optional variation in procedure is the saving in time of operating the gaging mechanism while retaining the advantages of eliminating the hand hammering and the advantage of the heat treatment.

I have described what I believe to be the best embodiments of my invention. I do not wish, however, to be confined to the embodiments shown, but what I desire to cover by Letters Patent is set forth in the appended claims.

I claim:

1. A surfacing machine for use in repairing battered rail joints comprising, in combination, an oxygen-cutting blowpipe having a defined jet axis, a carriage for the blowpipe, a main frame providing a guide for the carriage, retractable frame supporting gage blades mounted on the main frame and having rail contact edges engageable with riding strips of the rails which are settable mechanically into a common plane that substantially coincides with the plane of the surface to be formed by the cutting action of the blowpipe, means for adjusting the gage blades longitudinally of the rail to engage the rail in frame supporting relation substantially at the run-off points, and adjustable rail engaging frame supports located at a distance from one another considerably greater than the maximum available spacing of the gage blades from one another and substitutable for the gage blades in supporting the frame on the rail and maintaining the frame in the position determined by the gage blades, so that the gage blades can be retracted during the cutting action while the cutting is caused to progress along the path determined by the gage blades.

2. A surfacing machine as set forth in claim 1 which further includes a tilt adjusting support carried by the frame for adjusting the gage blades into tangent relation to the riding strips of the rails.

3. A surfacing machine as set forth in claim 1 which further includes a driving motor for the carriage, transmission mechanism driven by the motor for driving the carriage along the guide, including clutch mechanism and manual clutch controlling means for enabling the carriage to be manually shifted along the track relative to the frame.

4. A surfacing machine as set forth in claim 1 which further includes a driving motor for the carriage, transmission mechanism driven by the motor for driving the carriage along the guide, and a governor settable to control mechanically the travel of the carriage along the guide at a desired speed.

5. A surfacing and heat-treating machine comprising, in combination, a frame, a guide on the frame, a carriage on the guide, an oxygen-cutting blowpipe fixed on the carriage and having a defined jet axis, a traction track of deformable elastic material supported by the frame in parallelism to the guide, a drive wheel on the carriage engageable with the traction track, spring means normally maintaining the drive wheel in engagement with the traction track, and manually operable mechanism for disengaging the drive wheel from the traction track to enable the carriage to be manually shifted along the guide.

6. A surfacing and heat-treating machine comprising, in combination, a frame, a guide on the frame, a carriage on the guide, an oxygen-cutting blowpipe fixed on the carriage and having a defined jet axis, a traction track of deformable elastic material supported by the frame in parallelism to the path defined by the guide, a motor unit comprising a motor, a casing and transmission mechanism including an output gear engageable with the traction track, said unit being pivotally mounted on the carriage, spring means for urging the unit in a direction to engage the output gear with the track, and manually operable mechanism for disengaging the output gear from the track to enable the carriage to be manually shifted along the guide.

7. A surfacing and heat-treating machine for railroad rail and similar objects, comprising, in combination, a frame including three triangularly related corner post housings, corner posts adjustable in the respective housings, a gage beam pivotally mounted on the first of the post housings, a pair of gage blades mounted for sliding adjustment along the beam, a beam slide forming an adjustable extension of the gage beam, an abutment member carried by the second corner post housing and engageable by the extended beam slide to support the frame from the rail through the gage blades, the first and second corner posts being adjustable into engagement with the rail to serve as substitutes for the gage blades so that the gage beam can be swung up out of the way, a guide on the frame, a carriage on the guide, and an oxygen-cutting blowpipe fixed on the carriage and having a defined jet axis, the third corner post being adjustable to adjust the tilt of the frame and thereby set the jet axis substantially tangent to the riding strip.

HARRY S. GEORGE.

REFERENCES CITED

The following references are of record in the file of this patent:

UNITED STATES PATENTS

| Number | Name | Date |
|---|---|---|
| 1,811,835 | Anderson | June 30, 1931 |
| 1,862,848 | Fausek et al. | June 14, 1932 |
| 2,054,425 | Jones et al. | Sept. 15, 1936 |
| 2,075,842 | George | Apr. 6, 1937 |
| 2,152,213 | Rowland et al. | Mar. 28, 1938 |
| 2,176,287 | Backes | Oct. 17, 1939 |
| 2,178,938 | Ohmstead | Nov. 7, 1939 |
| 2,186,966 | George | Jan. 16, 1940 |
| 2,186,967 | George | Jan. 16, 1940 |
| 2,231,014 | Lytle et al. | Feb. 11, 1941 |
| 2,288,026 | Rea | June 30, 1942 |
| 2,326,906 | Walters | Aug. 17, 1943 |
| 2,441,474 | Deitrich | May 11, 1948 |
| 2,500,245 | Doyle | Mar. 14, 1950 |